Dec. 26, 1950   J. T. RATCLIFFE   2,535,318
MECHANISM FOR WINDING AND PAYING
OUT CABLES AND THE LIKE
Filed Aug. 4, 1947   3 Sheets-Sheet 2

INVENTOR
John T. Ratcliffe
BY
ATTORNEY

Dec. 26, 1950     J. T. RATCLIFFE     2,535,318
MECHANISM FOR WINDING AND PAYING
OUT CABLES AND THE LIKE
Filed Aug. 4, 1947     3 Sheets-Sheet 3
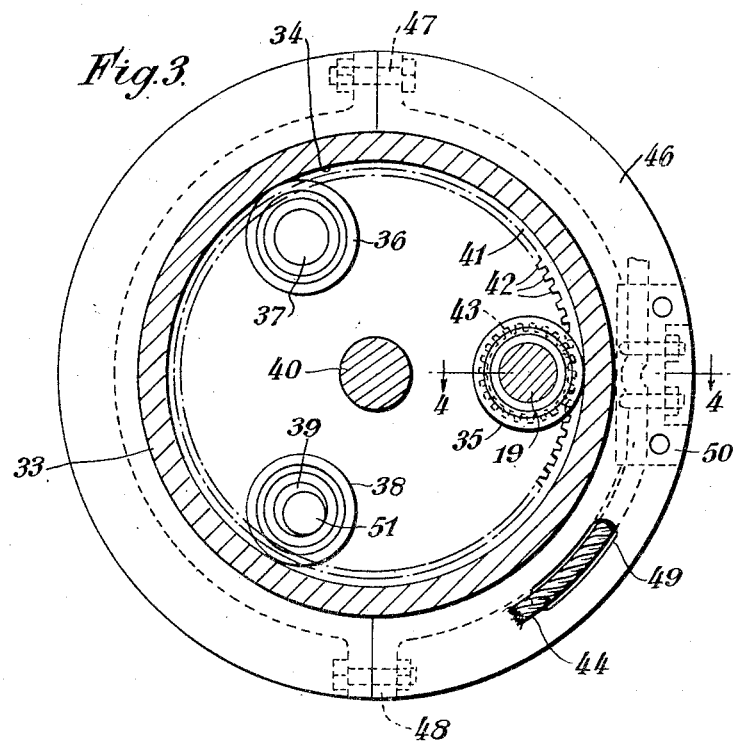
Fig. 3.
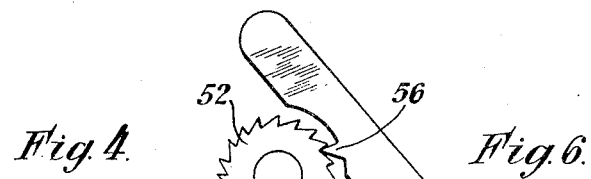
Fig. 4.     Fig. 6.
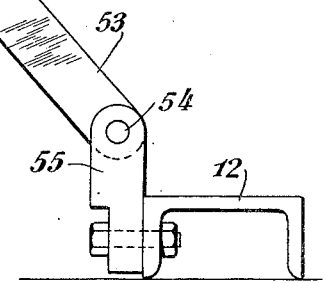
INVENTOR
John T. Ratcliffe
BY
ATTORNEY Patented Dec. 26, 1950

2,535,318

UNITED STATES PATENT OFFICE 2,535,318

MECHANISM FOR WINDING AND PAYING OUT CABLES AND THE LIKE

John Telford Ratcliffe, Frinton-on-Sea, England

Application August 4, 1947, Serial No. 766,073
In Great Britain February 8, 1946

Section 1, Public Law 690, August 8, 1946
Patent expires February 8, 1966

7 Claims. (Cl. 254—185)

This invention relates to mechanism for winding and paying out cables and the like.

It is the object of the invention to provide an improved mechanism for winding and paying out cables and the like, which is particularly convenient, adaptable and efficient in use, and which is also compact. The invention is particularly useful in connection with vehicles incorporating tipping ramps or the like, such for instance as is described in my British Patent Specification No. 497,216 dated December 13, 1938. The invention is also suitable for such purposes as tying up boats in harbour and other moorings, and for effecting the traversing movements of overhead cranes and the like.

According to the invention a winding and paying out mechanism comprises in combination a main drum, an auxiliary drum, winding means operating the main drum, and a ratchet device operatively interposed between the winding means and the auxiliary drum. Preferably the main drum and the auxiliary drum are provided each with a detent device to prevent it from paying out when required.

There is further provided according to the invention, a winding and paying out mechanism comprising a main drum in the form of an open-ended tube supported rotatably upon three or more internal bearers distributed around its circumference, internal gearing within said drum for rotating it, an auxiliary drum, and common driving means for operating the main and auxiliary drums. Conveniently the main and auxiliary drums are driven from a common handle or other source of power, rotation being imparted to the auxiliary drum through a ratchet device. Usually the cables or equivalent are wound upon the main and auxiliary drums in such a manner that for any given movement of the driving means, one of said cables is paid out while the other is being wound. Preferably the main drum is driven by means of reduction gearing comprising gear wheels and pinions mounted to rotate about a pair of spaced axes and adapted to provide various gear ratios, any one of which can be brought into action to suit the load.

The invention is illustrated by way of example in the accompanying diagrammatic drawings, in which:

Figure 3 is a transverse section taken on the line 3—3 of Figure 1 and drawn to an enlarged scale;

Figure 4 is a fragmentary plan taken on the line 4—4 of Figure 3;

Figure 5 is a transverse sectional elevation taken on the line 5—5 of Figure 1 and drawn to an enlarged scale;

Figure 6 is a similar view taken on the line 6—6 of Figure 1; and

Figure 7 is a diagram representing in side elevation a self-loading system for which the improved winding device is particularly intended.

Figure 1:
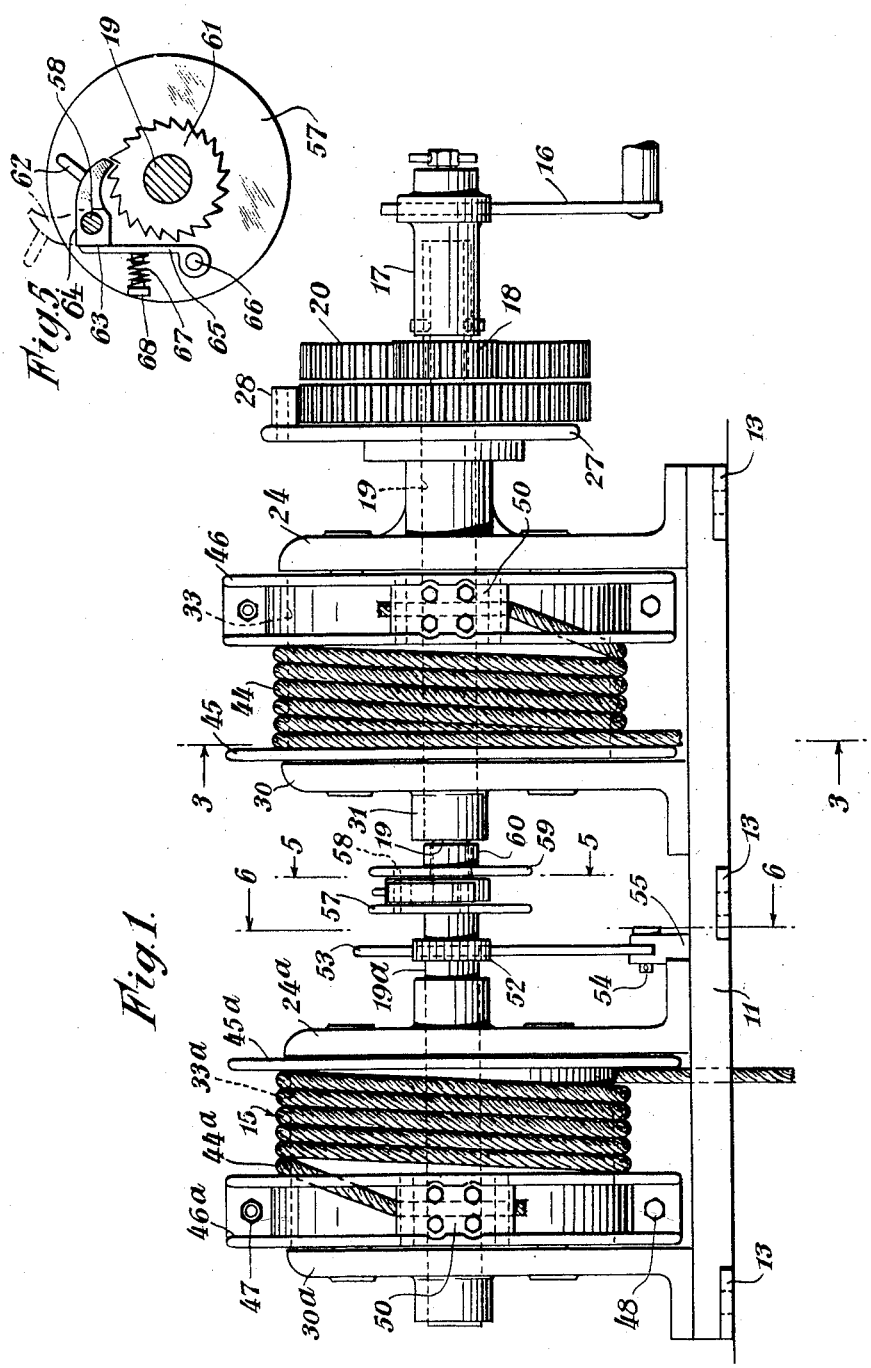
Figure 1 is a side elevation of the preferred form of winding unit.
Figure 2:
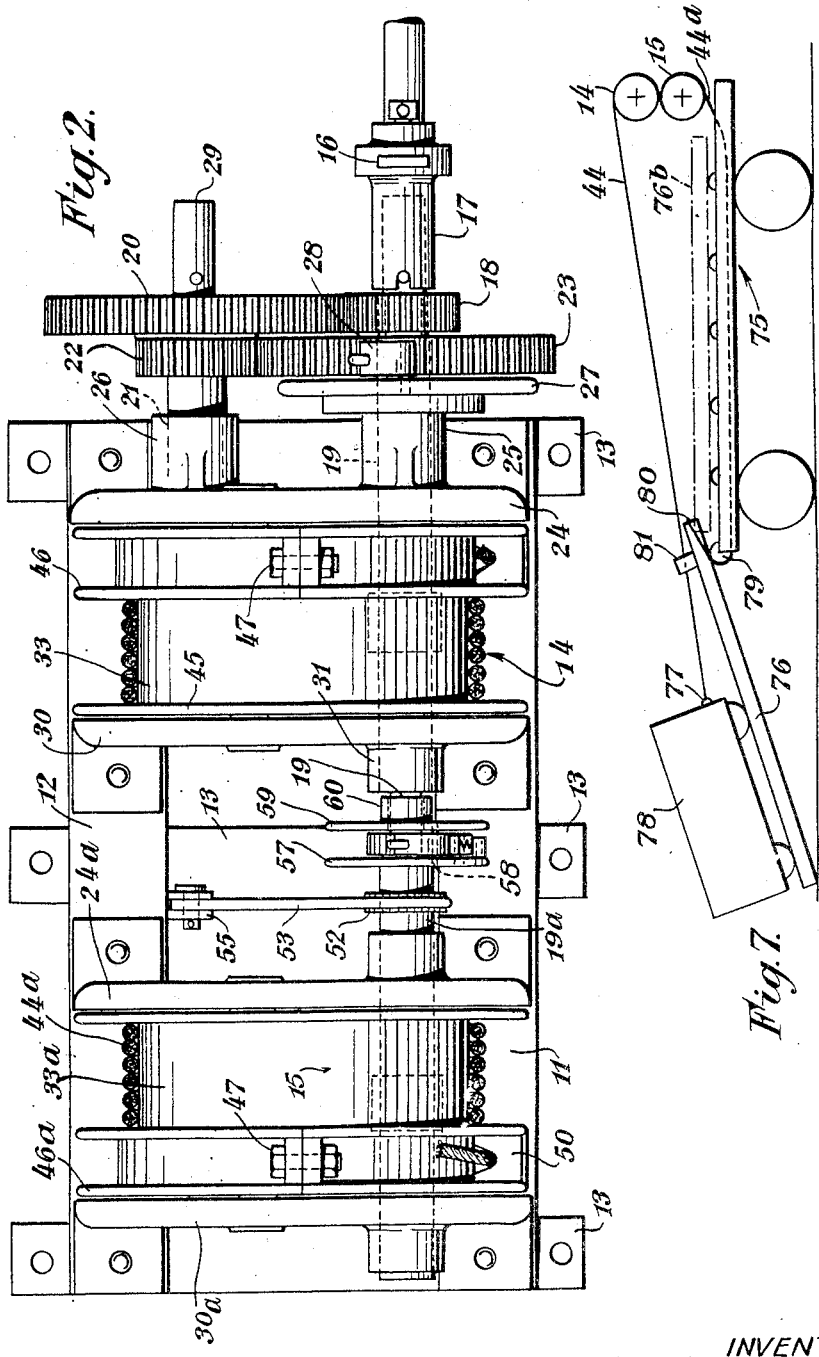
Figure 2 is a plan corresponding to Figure 1.

The unit which is shown generally in Figures 1 and 2 comprises a pair of longitudinal girders 11 and 12 connected by transverse members 13 to form a rectangular base. This carries a main drum assembly indicated at 14 and an auxiliary drum assembly 15 which are disposed coaxially and are arranged to be actuated by a common handle 16. The handle 16 is engaged with the spigot 17 of a pinion 18 which is freely rotatable upon a shaft 19 and which meshes with a gear wheel 20 freely rotatable upon a mutually parallel shaft 21. A pinion 22 formed upon the gear wheel 20 meshes with a gear wheel 23 secured fast upon the shaft 19. A bearing plate or bracket 24 secured to the base 11, 12 is formed with a bearing 25 for the shaft 19 while a tubular projection 26 serves as the mounting for the stationary shaft 21. The bearing 25 is fitted with a flange 27 carrying a detent 28 adapted normally to engage resiliently with the teeth of the gear wheel 23 and thus prevent the latter from turning backwards during the winding of the main drum 14; the detent 28 is arranged to be thrown out of action to enable the handle 16 to be turned backwards for unwinding the main drum 14 while the auxiliary drum 15 is being wound. Also the gear wheel 20 is provided with a spigot 29 adapted to receive the handle 16 when the load is light and a lower mechanical advantage suffices.

The main drum assembly 14 includes a second bearing bracket 30 having a bearing 31 for the shaft 19 which extends within a main drum 33 disposed between the brackets 24 and 30. This drum 33 is in the form of a hollow cylinder with open ends and is rotatably mounted in the manner shown in Figures 3 and 4. The drum has at each end an internal cylindrical race 34, which is engaged by three rotatable supports, namely a roller 35 freely mounted upon the shaft 19, a ball bearing 36 mounted upon a fixed rod 37 extending between the bearing brackets 24 and 30, and a ball bearing 38 mounted upon a rod 39, also extending between said bearing brackets. The members 19, 37 and 39 are spaced approximately 120° apart and therefore form an efficient bearing for the drum 33, the rod 39 having eccentric end portions (one of which is seen at 51, Figure 3) so that the drum can be readily adjusted to run without looseness, by turning the rod 39 before clamping it to the brackets 24, 30. A center rod 40 also connects together these brackets 24, 30 so as to produce a rigid and strong support. Between the races 34, the drum 33 has a thickened portion 41 formed with a circumferential series of internal gear teeth 42 meshing with a pinion 43 formed or mounted upon the shaft 19. The two rollers 35 are of an external diameter such that the pinion 43 is in full engagement with the gear teeth 42 when said rollers are pressed against the races 34.

Thus, rotation of the shaft 19, say in a clockwise direction, causes the drum 33 to be turned in the same direction but at a much slower rate owing to the mechanical advantage produced by the pinion 43 and gear teeth 42. The drum 33 is used for winding a wire rope 44 and is provided at one end with an integral flange 45 to retain said rope; the rope is retained at the other end of the drum 33 by an annular flange member 46 which is of channel-shape in radial section and is divided diametrically into two portions which are clamped together by bolts 47 and 48 as shown in Figure 3. By this means the flange member 46 can be adjusted axially upon the drum 33 so that its distance from the flange 45 is suitable for accommodating comfortably the requisite amount of rope 44, depending of course upon the length of the latter. One end of the rope 44 is anchored to the drum 33 and for this purpose it passes through an oblique hole 49 in the inner flange of the flange member 46, the end of said rope 44 being securely anchored within the channel of the flange member 46 by means of a bolted clamping plate 50.

The auxiliary drum 15 is of similar construction to the main drum 14 and the parts where shown are indicated with the same reference numerals but with the suffix a. The drum 33a, however, is reversed end for end so that the auxiliary rope 44a winds in the opposite direction to the main rope 44. The auxiliary drum 33a is driven by a shaft 19a which corresponds with the shaft 19 and carries a pinion (not shown) arranged to mesh with internal gear teeth within the drum 33a, the latter being rotatably supported upon rollers and ball bearings, the same as the main drum 14. A ratchet wheel 52 fast upon the shaft 19a is engaged by a detent 53 (see Figure 6) which is pivoted at 54 to a bracket 55 attached to the longitudinal girder 12, the detent 53 being urged by gravity or by a spring (not shown) so that a detent tooth 56 co-operates with the ratchet wheel 52 to prevent anti-clockwise rotation of the shaft 19a and auxiliary drum 33a. When required the detent 53 can be swung over, out of engagement with the ratchet wheel 52. Also mounted on the driving shaft 19a is a circular plate 57 which is connected by a pin 58 rigidly with a similar plate 59 having a boss 60 which runs freely upon the shaft 19 of the main drum assembly 14. A ratchet wheel 61 (having its teeth directed in the opposite sense to those of the wheel 52, is disposed between the plates 57 and 59 and is securely attached to the extremity of the shaft 19. A pawl 62 rotatably mounted upon the pin 58 is adapted to engage with the teeth of the ratchet wheel 61 so as to impart a one-way drive from the shaft 19 to the shaft 19a. In order to hold the pawl 62 resiliently in engagement with the teeth of the ratchet wheel 61, said pawl is formed with a boss having surfaces 63 and 64 mutually at right angles, the surface being engageable by an arm 65 which is pivoted to the plate 57 at 66 as shown in Figure 5. The arm 65 is urged resiliently towards the detent 62 by means of a coiled compression spring 67 abutting against a lug 68 upon the plate 57. It will thus be seen that as the pawl 62 rides over the teeth of the ratchet wheel 61, the surface 63 assumes an oblique position and pushes the arm 65 outwards against the force of the spring 67 which latter acts to return the pawl 62 towards its fully engaged position. When it is desired to disconnect the shaft 19a from the shaft 19, the pawl 62 is moved outwards to the position shown in broken lines, in which position it is retained owing to the engagement of the arm 65 with the flat surface 64.

In operation when the shaft 19 is turned clockwise it produces rotation of the drum 33 which winds up the rope 44, the detent 28 (which can be of the same construction as the pawl 62) riding upon the teeth of the gear wheel 23 so as to hold the load. The rotation of the shaft 19 is not, however, transferred to the shaft 19a as, even if the pawl 62 is in action, it merely rides over the teeth of the ratchet wheel 61. If during this stage of operation it is required to pay out the auxiliary rope 44a the detent 53 can be swung over to its disengaged position. To wind up the auxiliary rope 44a the handle 16 is turned anti-clockwise thus causing the ratchet wheel 61 to drive the shaft 19a through the pawl 62, the detent 53 holding any load in the auxiliary rope 44a; during operation in this manner the detent 28 must, of course, be moved to its inoperative position. Also the main rope 44 is paid out during anti-clockwise rotation of the handle 16 but if any slack should arise in said main rope 44 this can readily be taken up from time to time by turning the handle 16 through the requisite angle in the clockwise direction; such reverse rotation, of course, is not imparted to the shaft 19a owing to the one way action of the ratchet pawl 62.

The improved device is suitable for various haulage jobs but it has been primarily developed for self-loading vehicles of the general form described in my Patent Specification No. 497,216. The arrangement is shown diagrammatically in Figure 7. The vehicle which is indicated at 75 is of the platform type and is fitted with a ramp 76 adapted to be pulled up on rollers to the position 76b shown in broken lines. The main and auxiliary drum assemblies are indicated at 14 and 15 respectively and are shown one above the other instead of co-axial so that the action will be more clearly appreciated. The main rope 44 extends rearwards and is attached at 77 to the article which is being loaded, say a trolley 78. The auxiliary rope 44a extends from the auxiliary drum assembly 15 rearwards along the platform of the vehicle 75, then around a pulley or roller 79 at the back thereof and then forwards, the end of the auxiliary rope 44a being attached at 80 to the front part of the ramp 76. The vehicle is operated in the following manner. Starting with the ramp in the position 76b the detent 28 is released and the handle 16 is turned anti-clockwise, thus drawing in the auxiliary rope 44a so that the latter moves the ramp 76 rearwards, said ramp automatically tipping by gravity to its lowered position and sliding back as the winding continues until reaching the position shown in Figure 7. In the meantime the main rope 44 has been paid out and this rope is then attached to the load 78, which latter would, of course, be disposed at the foot of the ramp 16. The handle is then turned in the clockwise direction so as to wind the main rope 44, the detent 53 being thrown out of action for enabling the rope 44a to pay out as necessary from the auxiliary drum assembly 15. This, however, is not required at first as the winding of the main rope 44 acts to pull the load 78 up the ramp 16, the latter usually being provided with locking means (not shown) to hold it in position. When the load 78 reaches an abutment 81 at the front of the ramp 16 these locking means are released so that continued drawing in of the main rope 44 causes the ramp 76 itself to be drawn up to the position 76b, the auxiliary rope meanwhile paying out as the ramp 76 moves forwards. When unloading, a similar procedure is adopted, but it is then important that the main rope 44 should be maintained in a fairly taut condition to keep control on the load 78 while the ramp is moved to its sloping position. This, however, is readily achieved by occasionally turning the handle in the reverse (clockwise) direction to take up this slack, the detent 53 in the meantime holding any load in the auxiliary rope 44a. The load 78 (which is usually mounted on wheels if it has no wheels of its own) runs down the ramp by gravity. If the ramp 76 is to be returned empty it can be pulled back to the position 76b by securing the main rope 44 to the abutment 81 or any other suitable point on the ramp and then winding the main drum assembly 14.

In the improved driving means according to the invention the main drum and/or the auxiliary drum is of relatively large diameter and this has the advantage that the cable has a more gentle curvature; also the drum can be of any diameter without affecting the gear ratio as the number of internal teeth increases to correspond. The gearing is, of course, protected from the weather.

It will be understood that the arrangements which have been described are given merely by way of example and that various modifications may be made in the design and disposition of the parts to suit requirements. Thus the main and auxiliary drums may be disposed one above the other with their axes both horizontal, a spindle from the main drum being connected by a chain or gear drive with a spindle serving to drive the auxiliary drum through ratchet and pawl mechanism. Also where a drum of relatively long axial length is provided the adjustable cheek can conveniently be used to divide said drum into two portions adapted to take two separate cables. A brake may be provided in the usual way, if desired.

What I claim is:

1. A cable winding mechanism comprising a cable drum of hollow cylindrical shape, a ring of internal gear teeth formed within said drum, two internal circular races formed within said drum, one on each side of the ring of gear teeth, a driving shaft extending into said drum adjacent one side thereof, a toothed pinion which is fast on said shaft and meshes with the gear teeth, a pair of rollers mounted upon said shaft and freely rotatable thereon, said rollers being gripped radially between the shaft and the respective races when the pinion teeth are meshing to the correct depth with the internal ring of teeth, a plurality of guide spindles disposed within the drum at the side thereof remote from the driving shaft, and guide rollers on said spindles also engaging with the circular tracks.

2. A cable winding mechanism comprising a main cable drum of hollow cylindrical shape, a ring of internal gear teeth formed within said drum, two internal circular races formed within said drum, one on each side of the ring of gear teeth, a driving shaft extending into said drum adjacent one side thereof, a toothed pinion which is fast on said shaft and meshes with the gear teeth, a pair of rollers mounted upon said shaft and freely rotatable thereon, said rollers being gripped radially between the shaft and the respective races when the pinion teeth are meshing to the correct depth with the internal ring of teeth, a plurality of guide spindles disposed within the drum at the side thereof remote from the driving shaft, guide rollers on said spindles also engaging with the circular tracks, an auxiliary drum disposed coaxially with respect to the main drum, a driving shaft for the auxiliary drum disposed axially in line with the driving shaft of the main drum, a ratchet coupling between the two driving shafts, a ring of internal gear teeth and a circular race formed within the auxiliary drum, a pinion on the corresponding driving shaft in engagement with said teeth, and rollers on said shaft engaging the race and holding the pinion correctly in mesh with the ring of gear teeth of the auxiliary drum.

3. A cable winding mechanism comprising a pair of plate-like mounting brackets disposed in mutually parallel planes, a cable drum of hollow cylindrical shape fitted between said mounting brackets so that said brackets respectively close the two ends of the drum, a ring of internal gear teeth formed within said drum, two internal circular races formed within said drum, one on each side of the ring of gear teeth, a driving shaft journalled in the two mounting brackets and extending through the drum adjacent the circumference thereof, a toothed pinion which is fast on said shaft and meshes with the gear teeth, a pair of rollers mounted upon said shaft and freely rotatable thereon, said rollers being gripped radially between the shaft and the respective races when the pinion teeth are meshing to the correct depth with the internal ring of teeth, a plurality of guide spindles each extending from one mounting bracket to the other and extending through the drum at the side thereof remote from the driving shaft, and guide rollers on said spindles also engaging with the circular tracks.

4. A cable winding mechanism according to claim 3, including eccentric end portions which are formed on one of the guide spindles and fit rotatably in the mounting brackets, whereby angular movement of the said spindle causes the corresponding rollers to be adjustably moved towards and away from the races in the drum.

5. A cable winding mechanism according to claim 4, including one end flange formed integrally with the drum, and an attached flange member which embraces the drum and is adjustable longitudinally thereof, clamping means being provided for tightening the attached flange member circumferentially around the drum.

6. A cable winding mechanism according to claim 5, in which the attached flange member is channel shaped in radial cross section, and a cable anchorage clamp is fitted between the flanges thereof, an aperture being formed in one of the flanges of the flange member adjacent the anchorage clamp for conducting a cable to said cable anchorage clamp.

7. A cable winding mechanism according to claim 6, in which the attached flange member comprises two semi-circular portions, a lug at each end of each portion and screws fastening the adjacent lugs together to clamp the flange member around the drum.

JOHN TELFORD RATCLIFFE.

REFERENCES CITED

The following references are of record in the file of this patent:

UNITED STATES PATENTS

| Number | Name | Date |
|---|---|---|
| 524,520 | Barrett | Aug. 14, 1894 |
| 677,002 | Tryon | June 25, 1901 |
| 866,820 | Smith | Sept. 24, 1907 |
| 1,792,467 | Osgood | Feb. 10, 1931 |
| 1,956,806 | Mitzen et al. | May 1, 1934 |
| 2,192,842 | Schat et al. | Mar. 5, 1940 |

FOREIGN PATENTS

| Number | Country | Date |
|---|---|---|
| 6,493 | Great Britain | of 1908 |
| 168,117 | Great Britain | Aug. 15, 1921 |